United States Patent [19]

Knodt et al.

[11] Patent Number: 5,148,286
[45] Date of Patent: Sep. 15, 1992

[54] METHOD AND APPARATUS FOR OPERATING AN ELECTRONIC REPROGRAPHIC PRINTING SYSTEM UPON SCAN INTERRUPTION

[75] Inventors: Kurt T. Knodt, Rochester; Herbert J. Raymor, Holcomb; Gerald L. Coy, Rochester; James R. Graves, Ontario; Randall P. Cole, Penfield; John F. Gauronski, Rochester, all of N.Y.

[73] Assignee: Xerox Corporation, Fairfield, Conn.

[21] Appl. No.: 589,541

[22] Filed: Sep. 28, 1990

[51] Int. Cl.⁵ .................... H04N 1/21; H04N 1/32; G03G 21/00
[52] U.S. Cl. .................... 358/296; 358/300; 358/437; 358/468; 355/313; 355/314
[58] Field of Search .................... 355/313, 314; 358/76, 358/296, 437, 468, 300

[56] References Cited

U.S. PATENT DOCUMENTS

| | | | |
|---|---|---|---|
| 4,090,787 | 5/1978 | Hubbard et al. | 355/314 |
| 4,099,860 | 7/1978 | Connin | 355/314 |
| 4,229,100 | 10/1980 | Travis | 355/77 |
| 4,302,782 | 11/1981 | Gunning et al. | 358/296 |
| 4,511,241 | 4/1985 | Tsudaka et al. | 355/314 X |
| 4,571,069 | 2/1986 | Kimura et al. | 346/154 X |
| 4,740,814 | 4/1988 | Folkins | 355/202 |
| 4,918,490 | 4/1990 | Stemmle | 355/318 |
| 4,920,427 | 4/1990 | Hirata | 358/437 |
| 4,958,232 | 9/1990 | Sugiura et al. | 358/300 |
| 4,967,266 | 10/1990 | Yamamoto | 358/76 |
| 4,990,967 | 2/1991 | Colglazier et al. | 355/314 X |

Primary Examiner—George H. Miller, Jr.
Assistant Examiner—Eric Frahm
Attorney, Agent, or Firm—Oliff & Berridge

[57] ABSTRACT

A method and apparatus for operating an electronic reprographic system upon detection of a fault are described. Original documents of a job to be printed are scanned to provide images for storage. When scanning is interrupted, the last captured image is stored and selectively displayed. If scanning is not completed before the interruption, the system is monitored for the occurrence of a fault before scanning is resumed. The detection of a fault occurrence requires clearance of the paper path before scanning operation can be resumed. If scanning is completed, printer operation is enabled to provide image output. Partially completed scan jobs resulting from scanner interruption are saved in operator accessible memory.

24 Claims, 12 Drawing Sheets

METHOD AND APPARATUS FOR OPERATING AN ELECTRONIC REPROGRAPHIC PRINTING SYSTEM UPON SCAN INTERRUPTION

BACKGROUND OF THE INVENTION

1. Field of the Invention

The present invention relates to a system of electronic reprographics and, more particularly, to a system of electronic reprographics which displays the last image captured in memory following an interruption of scanning and which enables operator access to a partially completed job.

2. Description of the Related Art

In light lens printing systems, a lamp or flashing unit flashes light on a document and has an image created synchronously on a photoreceptor belt. The photoreceptor belt picks up toner from which a copy is made.

In electronic reprographic printing systems, a document or series of documents comprising at least one print job are successively scanned. Upon scanning of the documents, image signals are obtained and electronically stored. The signals are then read out successively and transferred to a printer for formation of the images on paper. Once a document is scanned, it can be printed any number of times or processed in any number of ways (e.g., words deleted or added, image magnified or reduced, etc.). If a plurality of documents comprise a job which is scanned, the processing or manipulation of the scanned documents can include deletion of one or more documents, reordering of the documents into a desired order, or addition of a previously or subsequently scanned document or documents. The printing or processing can be relatively synchronous with scanning, or asynchronous after scanning. If asynchronous, a time interval exists between scanning and printing or processing. The system can then accumulate a number of scanned jobs in the system memory for subsequent processing or printing.

For a variety of reasons, operation in an electronic reprographic system can be interrupted. This can be the result of a scanner or printer fault, hardware or software faults, paper misfeed, intentional interruption, memory loss, etc. Upon such an interruption due to scanner fault, the operator, not knowing precisely where the scanner ceased operation, must either scan the entire job over again, initiate scanning at a document believed to precede the last scanned document and remove duplicate sheets from the job, or proof what has been scanned so far. When scanner operation is interrupted before the scanner has completed building a job, documents present in the paper path can be damaged and the integrity of the job cannot be guaranteed.

The related art has disclosed printing systems which provide display to the operator.

U.S. Pat. No. 4,740,814 to Folkins discloses a xerographic printing machine which senses an optical image from an original and, in response, generates an electrical video display of the image. The electrical video image allows an operator to both preview the optical image corresponding to the original and adjust the image before printing.

U.S. Pat. No. 3,619,049 to Starkweather et al. discloses a system having an image viewing and storing capability. A phosphorescent support is included which is capable of intercepting radiation from a source and forming an image radiation pattern. This pattern can be viewed by an operator.

U.S. Pat. No. 4,229,110 to Travis discloses a copy recovery portion in a copy machine which includes an image counter. The counter manifests a numerical value to an operator corresponding to images on copy paper in copy paths. In the case of a jam, preprogrammed system logic calculates a number which corresponds to the number of documents which need to be recopied. This number is displayed to the operator.

U.S. Pat. No. 4,545,672 to Ozawa discloses a reading, printing and copying device including an image sensor for receiving a predetermined potential and a light beam reflected from an original. A memory is further provided for storing an original reading signal.

While the related art recognizes that display can be provided to the operator, it does not relate display with images stored in memory upon detection of an interruption in scanner operation.

OBJECTS AND SUMMARY OF THE INVENTION

Accordingly, one object of the present invention is to provide an electronic reprographic system which displays to the operator the last image captured upon detection of an interruption in scanner operation to enable scanning t o quickly and easily be resumed at the appropriate document.

Another object of the present invention is to provide an electronic reprographic system which enables the operator to access a job before its completion, thereby facilitating job manipulation without requiring rescanning.

A further object of the present invention is to provide an electronic reprographic system which requires paper path clearance in response to system fault detection when scanner operation is interrupted before completion to guarantee job integrity and prevent document damage.

To achieve the foregoing and other objects, and to overcome the shortcomings discussed above, an electronic reprographic system for printing a job is provided which detects any interruption in the operation of the scanner. A display is provided of the last image captured in memory. If scanning of the job is not complete, the system detects whether a fault has occurred in the system. When scanning interruption is not the result of a system fault, scanning can be resumed by operator intervention. When the interruption is the result of a system fault, the paper path must be cleared before scanning can be resumed.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

Figure 1:
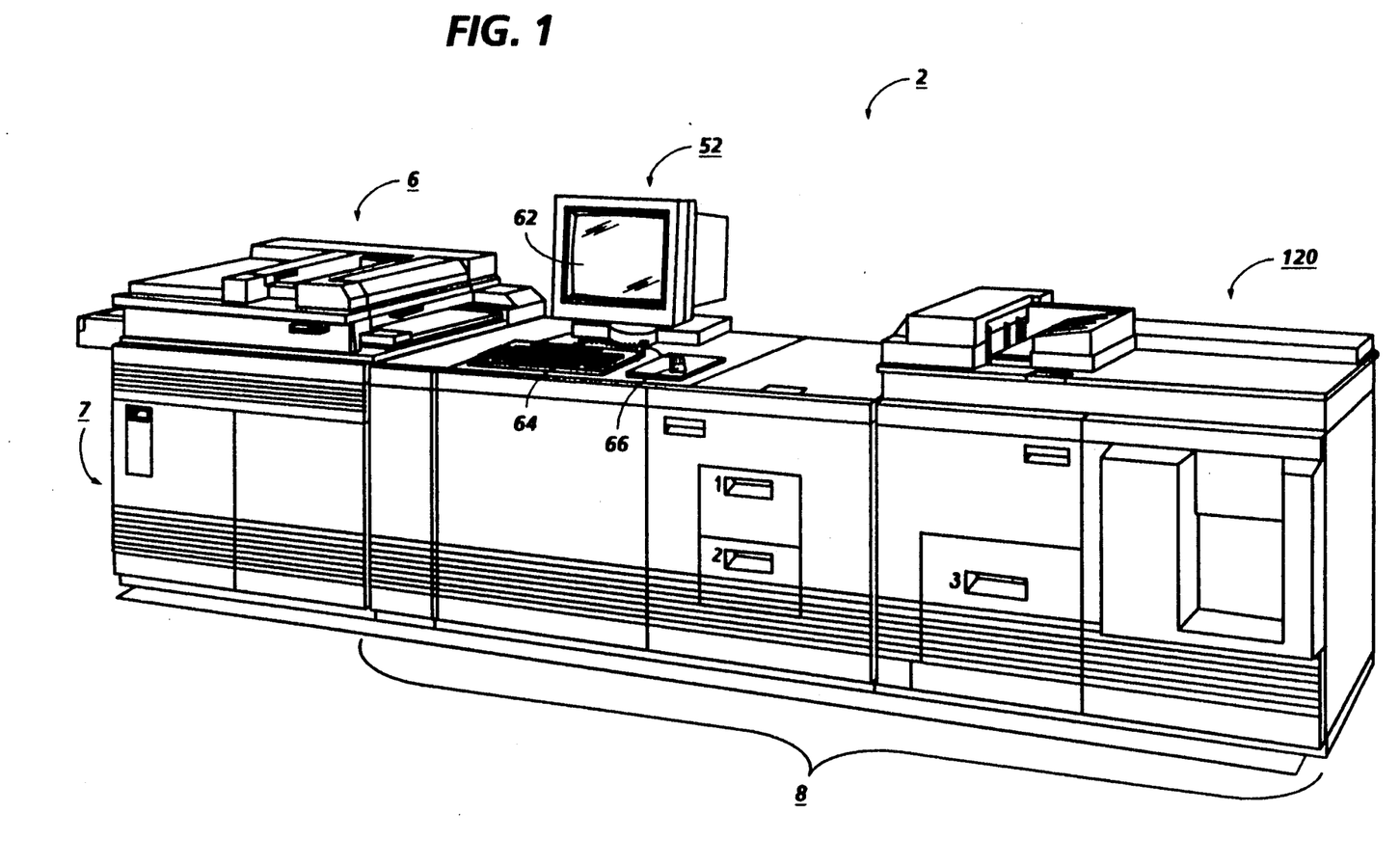
FIG. 1 is a view depicting an electronic printing system incorporating the features of the present invention.
Figure 2:
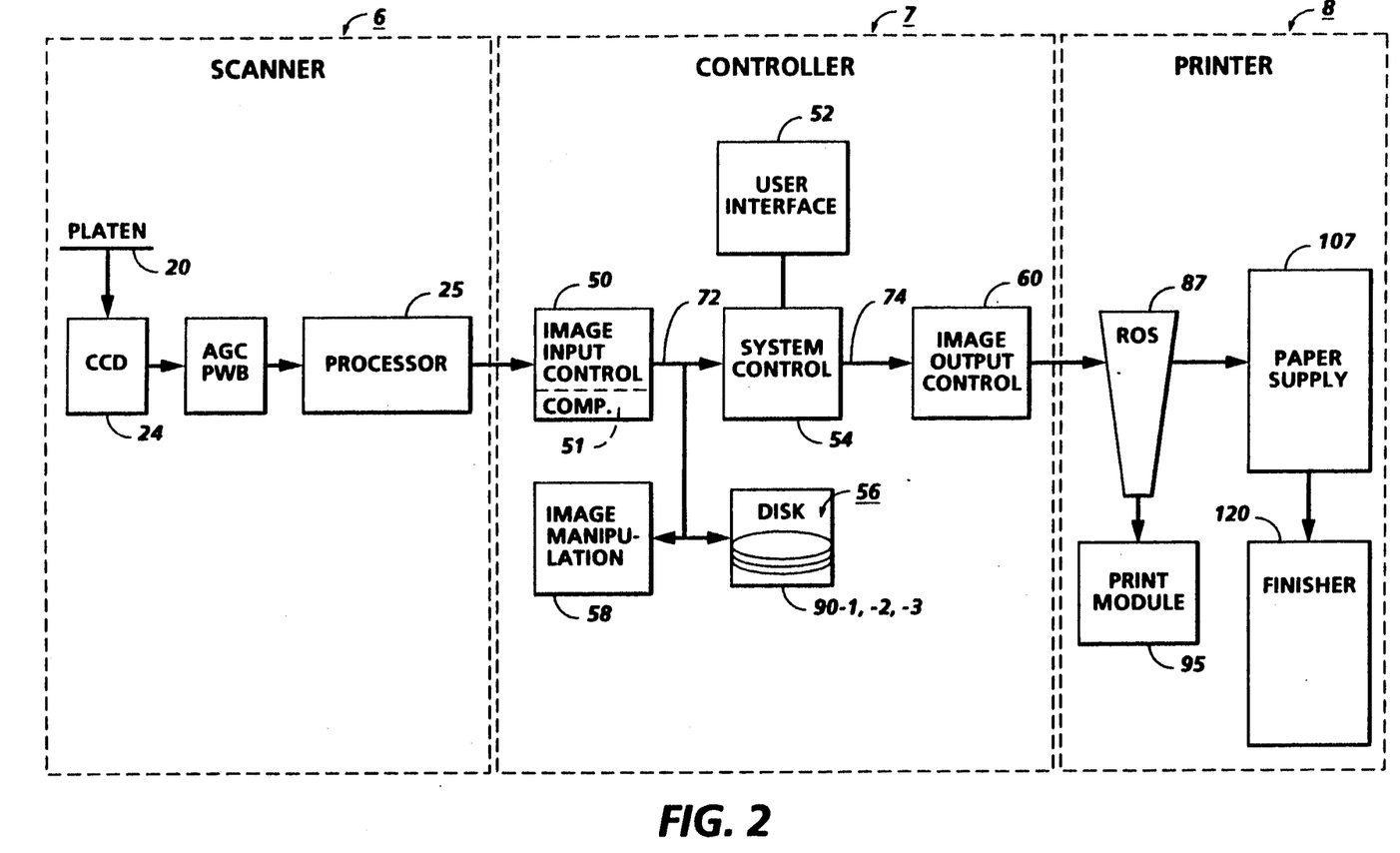
FIG. 2 is a block diagram depicting the major elements of the printing system shown in FIG. 1.

Referring now to the drawings, and particularly to FIGS. 1 and 2 thereof, there is shown an exemplary printing system 2 for processing print jobs in accordance with the teachings of the present invention. Printing system 2, for purposes of explanation, is divided into a scanner section or image input terminal (IIT) 6, controller section 7, and printer section or image output terminal (IOT) 8. While a specific printing system is shown and described, the present invention may be used with other types of printing systems such as ink jet, ionographic, etc.

Figure 3:
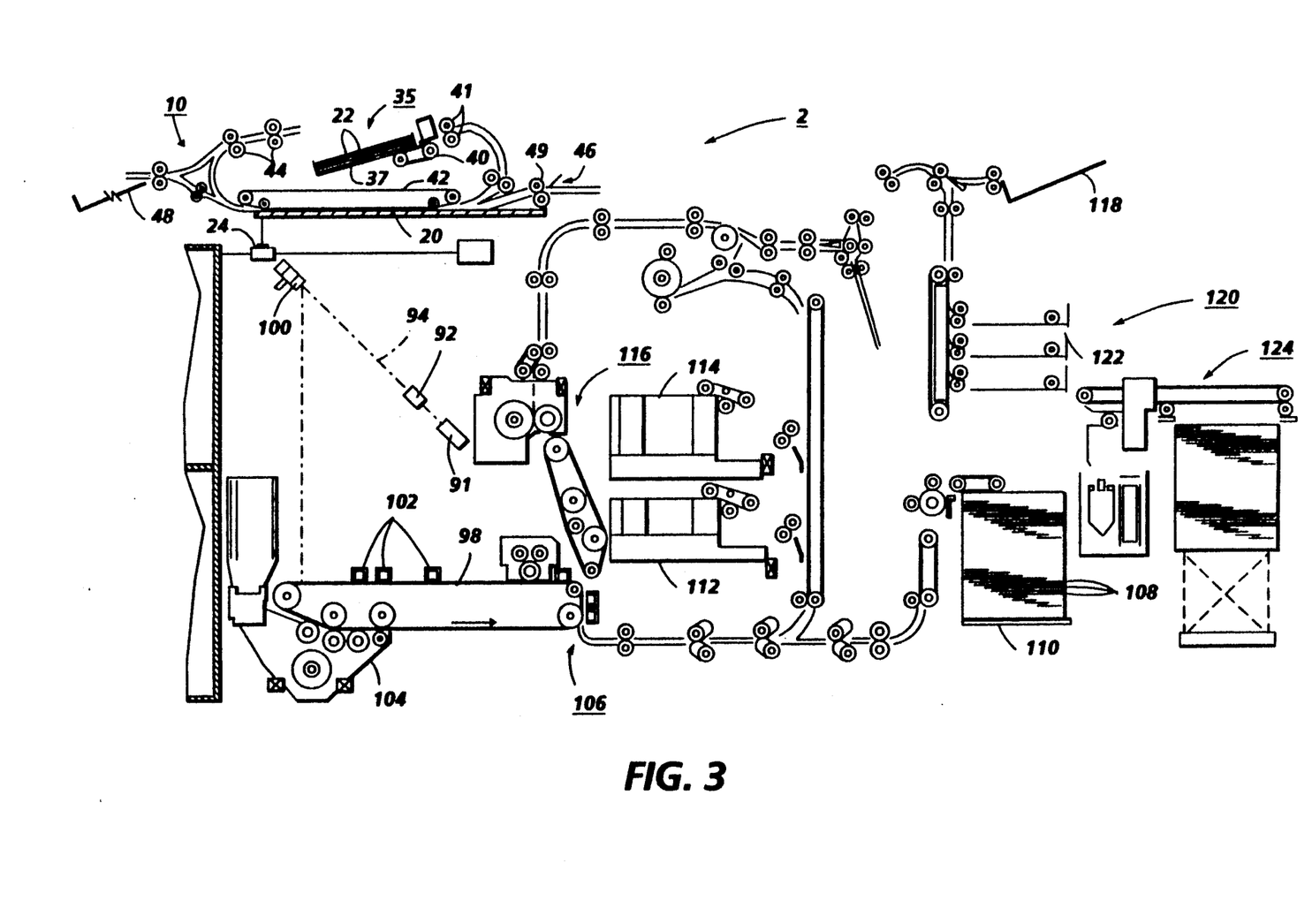
FIG. 3 is a plan view illustrating the principal mechanical components of the printing system shown in FIG. 1.
Figure 4:
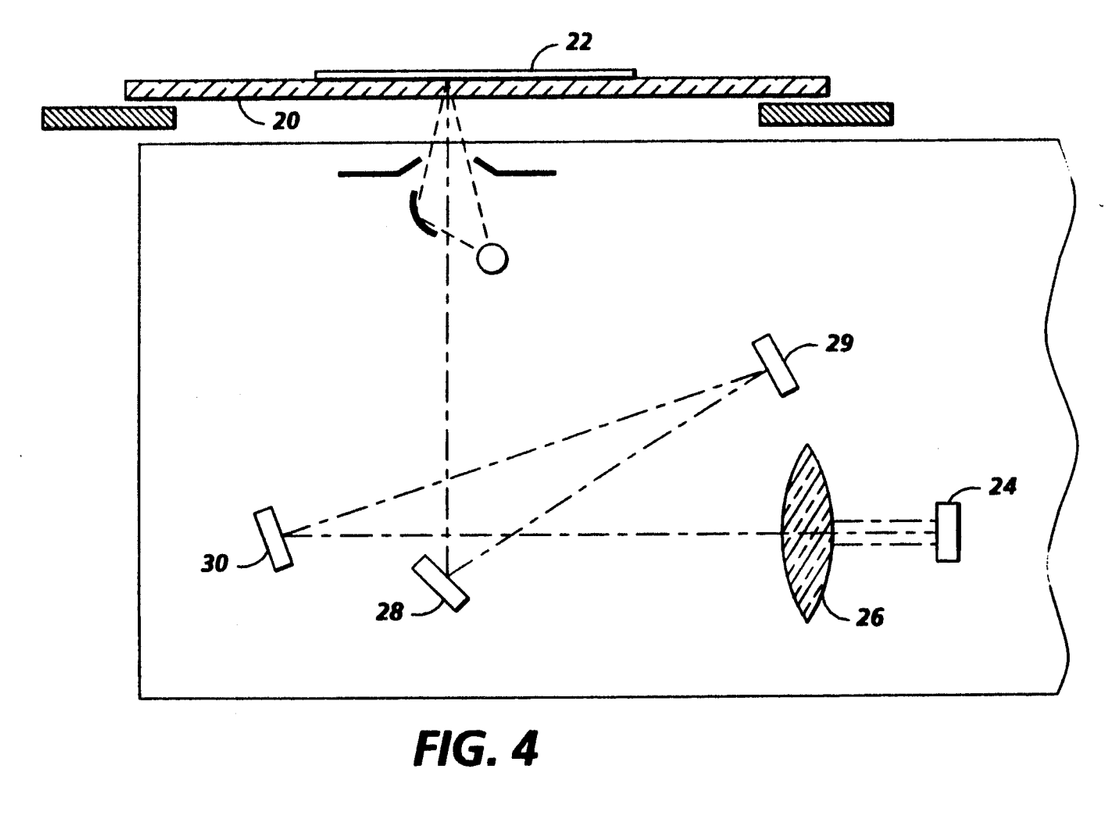
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line-like segment of platen 20 and the document being scanned thereon. Array 24 provides image signals or pixels representative of the image scanned which, after suitable processing by processor 25, are output to controller section 7.

Processor 25 converts the analog image signals output by array 24 to digital image signal and processes the image signals as required to enable system 2 to store and handle the image data in the form required to carry out the job programmed. Processor 25 also provides enhancements and changes to the image signals such as filtering, thresholding, screening, cropping, reduction-/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40, document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and, for purposes of explanation, is separated into a Raster Output Scanner (ROS) section 87, Print Module Section 95, Paper Supply section 107, and Finisher 120. ROS 87 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main Paper tray 110 or from auxiliary Paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Figure 5A:
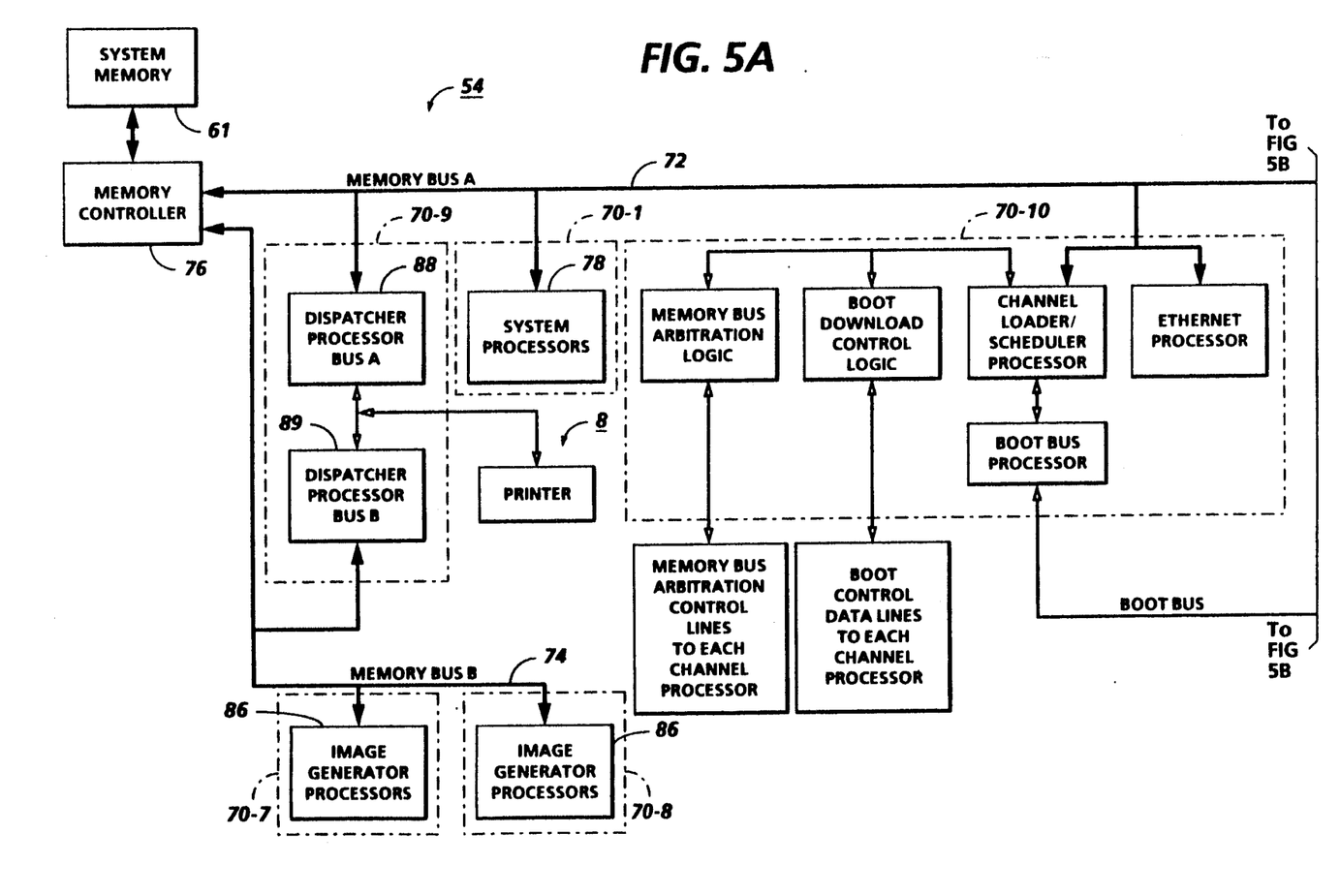
FIGS. 5A, 5B, and 5C comprise a schematic block diagram showing the major parts of the control section for the printing system, shown in FIG. 1.
Figure 5B:
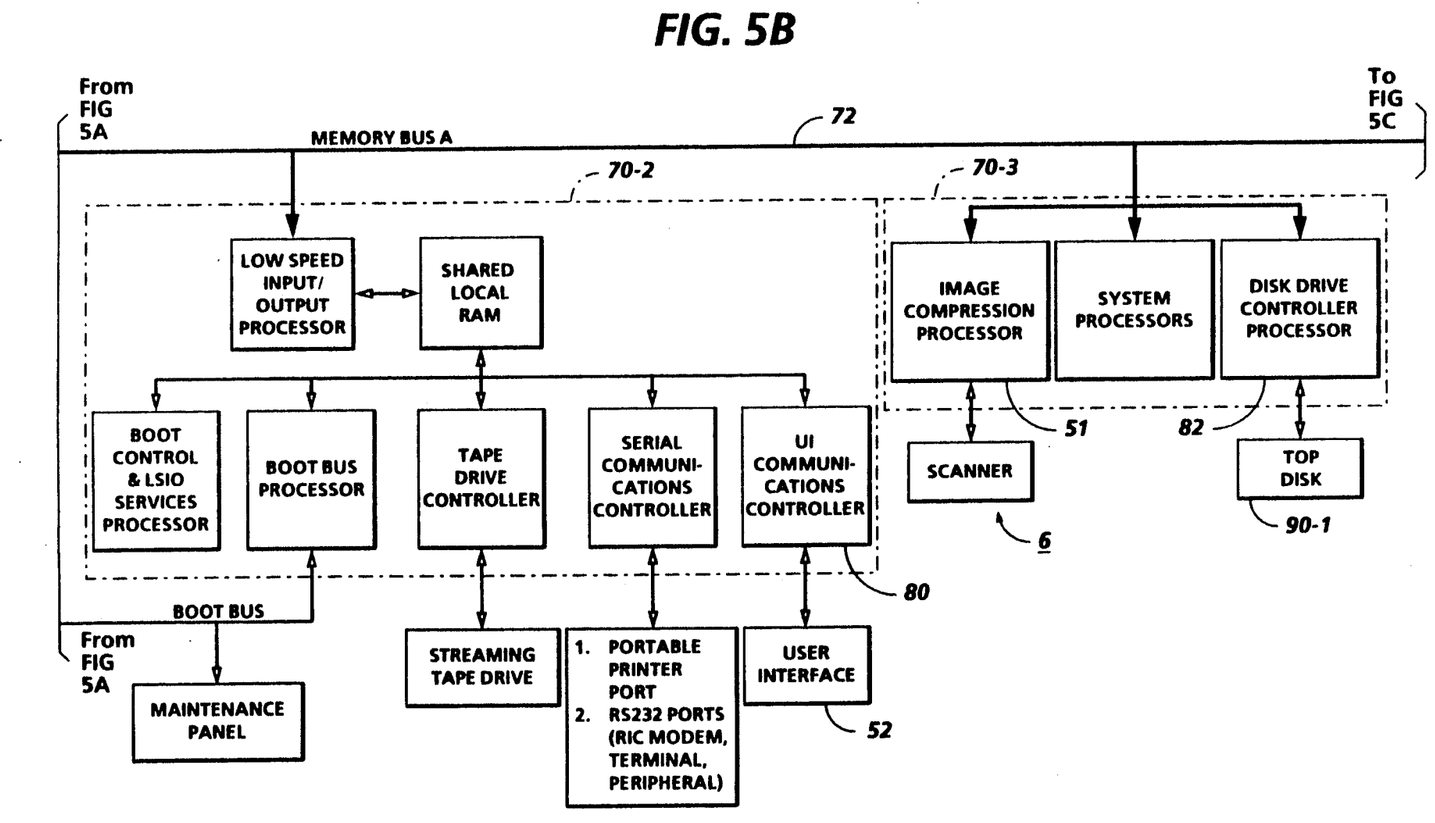
Figure 5C:
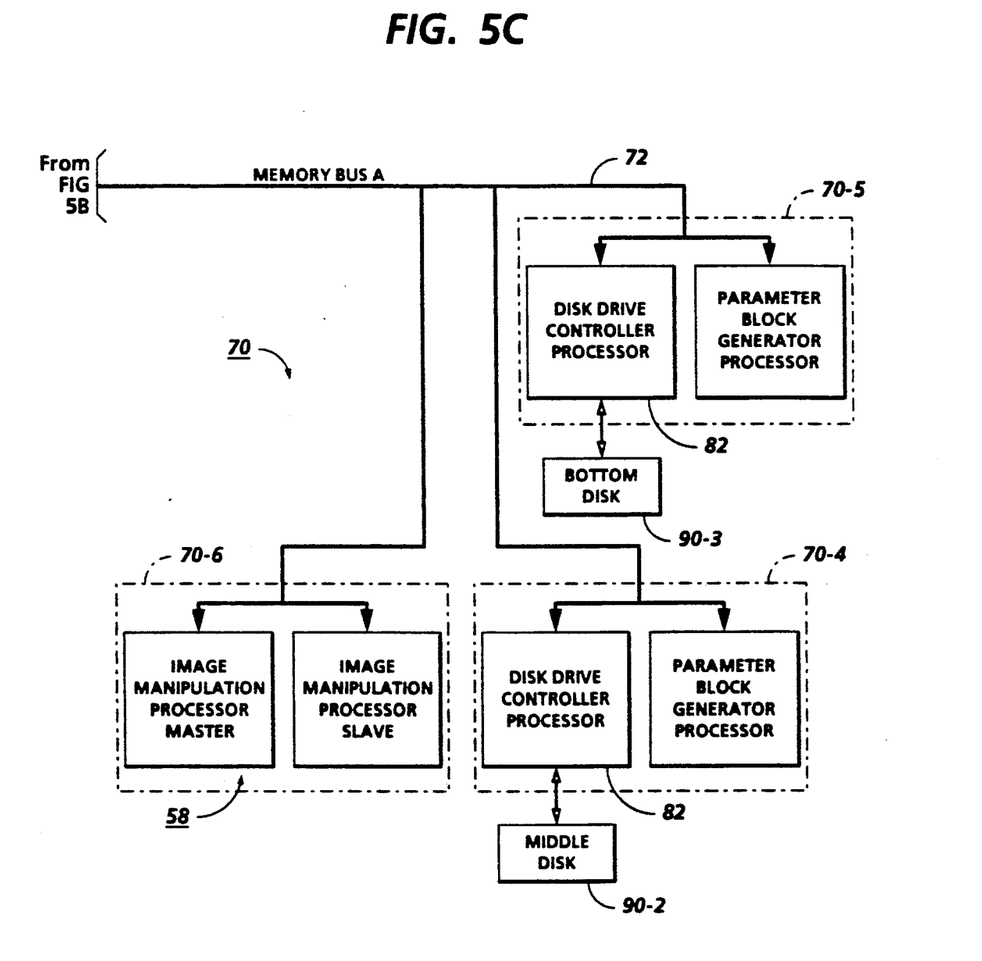

Referring to FIGS. 2 and 5, controller section 7 is, for explanation purposes, divided into an image input controller 50, User Interface (UI) or dialog 52, system controller 54, main memory 56, image manipulation section 58, and image output controller 60.

Referring particularly to FIGS. 5A-5C, control section 7 includes a plurality of Printed Wiring Boards (PWB's) 70, PWB's 70 being coupled with one another and with System Memory 61 by a pair of memory buses 72,74. Memory controller 76 couples System Memory 61 with buses 72, 74. PWB's 70 include system processor PWB 70-1 having plural system processors 78; low speed I/O processor PWB 70-2 having UI communication controller 80 for transmitting data to and from UI 52; PWB's 70-3, 70-4 and 70-5 having disk drive controller/processors 82 for transmitting data to and from disks 90-1, 90-2 and 90-3, respectively, of main memory 56 (image compressor/processor 51 for compressing the image data is on PWB 70-3); image manipulation PWB 70-6 with image manipulation processors of image manipulation section 58; image generation processor PWB's 70-7 and 70-8 with image generation processor 86 for processing the image data for printing by printer section 8; dispatch processor PWB 70-9 having dispatch processors 88 and 89 for controlling transmission of data to and from printer section 8; and boot control-arbitration-scheduler PWB 70-10.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice printers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc., are carried out. Following processing, the data may be returned to main memory 56, sent to UI 52 for display on touchscreen 62, or sent to image output controller 60.

Image data output to image output controller 60 is decompressed and readied for printing by image generating processors 86 of PWB's 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 6:
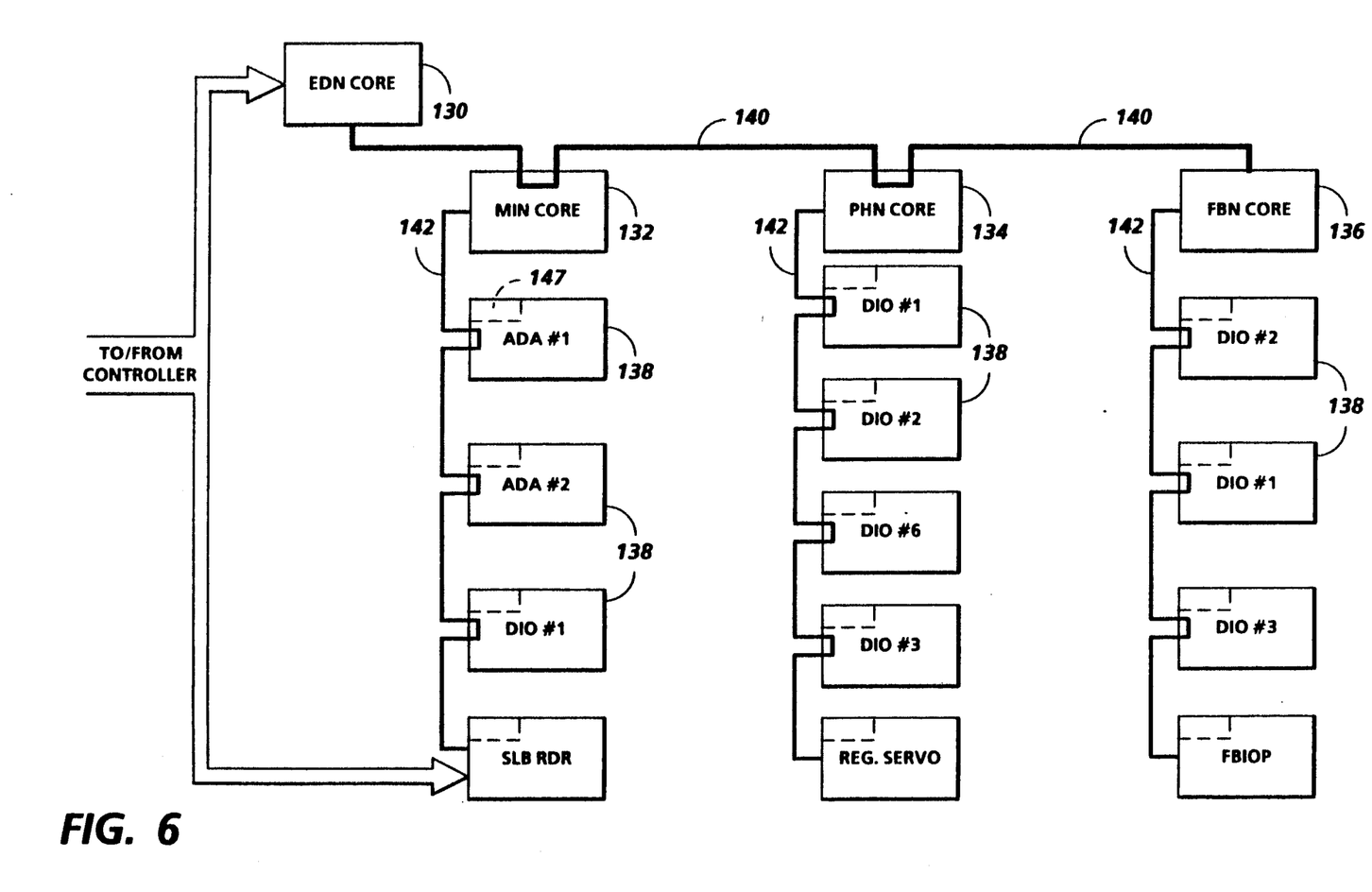
FIG. 6 is a block diagram of an Operating System, together with Printed Wiring Boards and shared line connections for the printing system shown in FIG. 1.

Referring particularly to FIG. 6, system control signals are distributed via a plurality of printed wiring boards (PWB's). These include Electronic Data Node (EDN) core PWB 130, Marking Imaging core PWB 132, Paper Handling core PWB 134, and Finisher Binder core PWB 136 together with various Input/Output (I/O) PWB's 138. A system bus 140 couples the core PWB's 130, 132, 134 and 136 with each other and with controller section 7 while local buses 142 serve to couple the I/O PWB's 138 with each other and with their associated core PWB.

On machine power up, the Operating System software is loaded from memory 56 to EDN core PWB 130 and from there to the remaining core PWB's 132, 134 and 136 via bus 140, each core PWB 130, 132, 134, 136 having a boot ROM (not shown) for controlling downloading of Operating System software to the PWB, fault detection, etc. Boot ROMs also enable transmission of Operating System software and control data to and from PWB's 130, 132, 134 and 136 via bus 140 and control data to and from I/O PWB's 138 via local buses 142. Additional ROM, RAM, and NVM memory types are resident at various locations within system 2.

Figure 7:
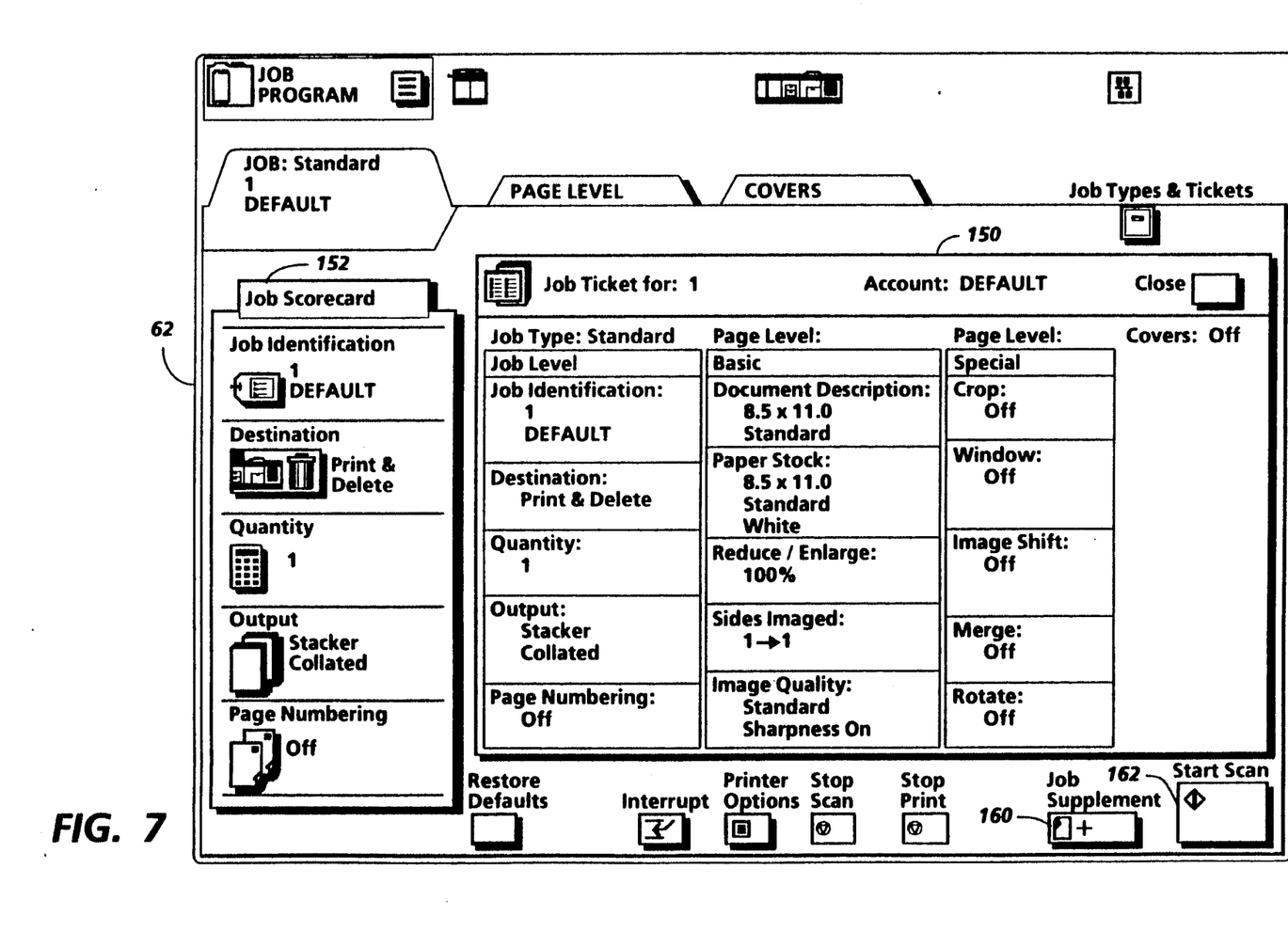
FIG. 7 is a view depicting an exemplary job programming ticket and job scorecard displayed on the User Interface (UI) touchscreen of the printing system shown in FIG. 1.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

The present invention includes a crash recovery operation which will return the system elements to a functional state after a crash (an unpredictable condition in any part of system 2 which causes a subset of the system elements to become unavailable to the operator) has occurred. During recovery, the initial cause of the crash (i.e., the fault) must be cleared. Whenever possible, the first attempt at recovery will be automatic, with no operator intervention, and without impact to the other system elements. If assistance is required, it will be at the operator level. If a hardware failure is detected during the self-test, a fault code will be displayed at UI 52 to alert the operator that a service call is in order.

Figure 8:
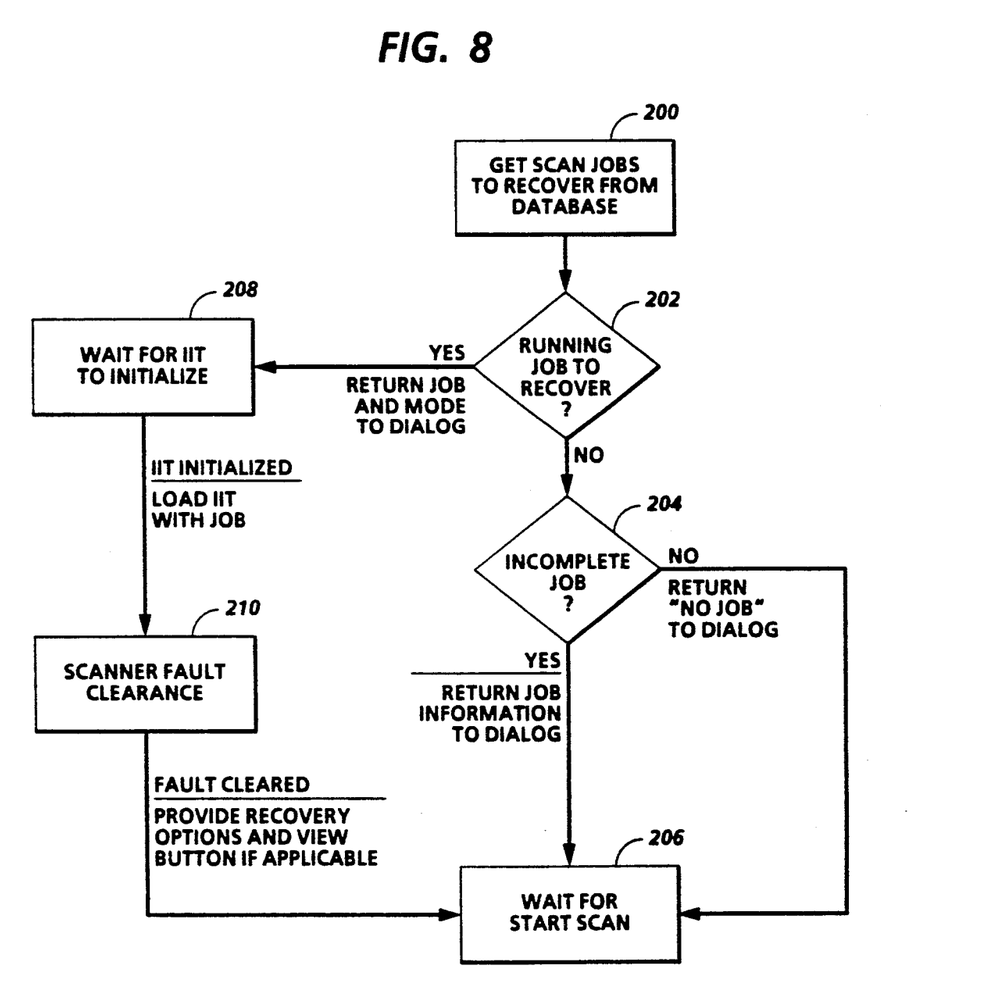
FIG. 8 is a flowchart depicting the crash recovery feature of the present invention.

Referring to FIG. 8, there is shown a flowchart depicting a crash recovery operation according to the present invention. Initial step 200 comprises getting scan jobs to recover from the database. Next, it is determined whether there is a running job to recover (Step 202). If there is no running job, a "No Job" indication, is returned to the dialog or UI 52. If there is an incomplete job, the job information is returned to the dialog or UI 52. The system 2 then waits for start scan to be selected by the operator (Step 206).

If, at Step 202, it is determined that there is a running job to recover, the job and mode is returned to the dialog or UI 52. System 2 waits for the IIT or scanner 6 to initialize (Step 208). The IIT is initialized and loaded with the job. Scanner fault clearance instructions are provided by the dialog or UI 52 to the operator (Step 210). The fault is cleared, and the system 2 returns to the state in which it waits for start scan to be selected by the operator (Step 206).

The Appendix sets forth a crash recovery computer program which can be used in accordance with the present invention.

Prior to reinitiation of scanning, the last image stored in memory can be displayed to the operator to facilitate scanning resumption. The display of the last captured image enables the operator to immediately determine the next image in the job to be scanned (if there are any left to be scanned). The display can be provided for scanning modes such as platen scanning (platen mode), semi-automatic document feeding (SADH) and computer fanfold feeding (CFF mode). The operator is thus saved a considerable amount of time over other possible alternatives such as scanning the job over again, removing duplicate sheets from the job or proofing what has been scanned so far.

In the Recirculating Document Handling Mode (RDH mode), the last stored image need not be displayed. After the paper path is cleared and the documents reordered in ADF 35, scanning of the documents is resumed so that the system will automatically slew feed the documents to the document corresponding to the last stored image, or the document immediately following the last stored document. The controller instructs the scanner to resume scanning from that point by searching the contents on the disc for the last captured image.

Figure 9:
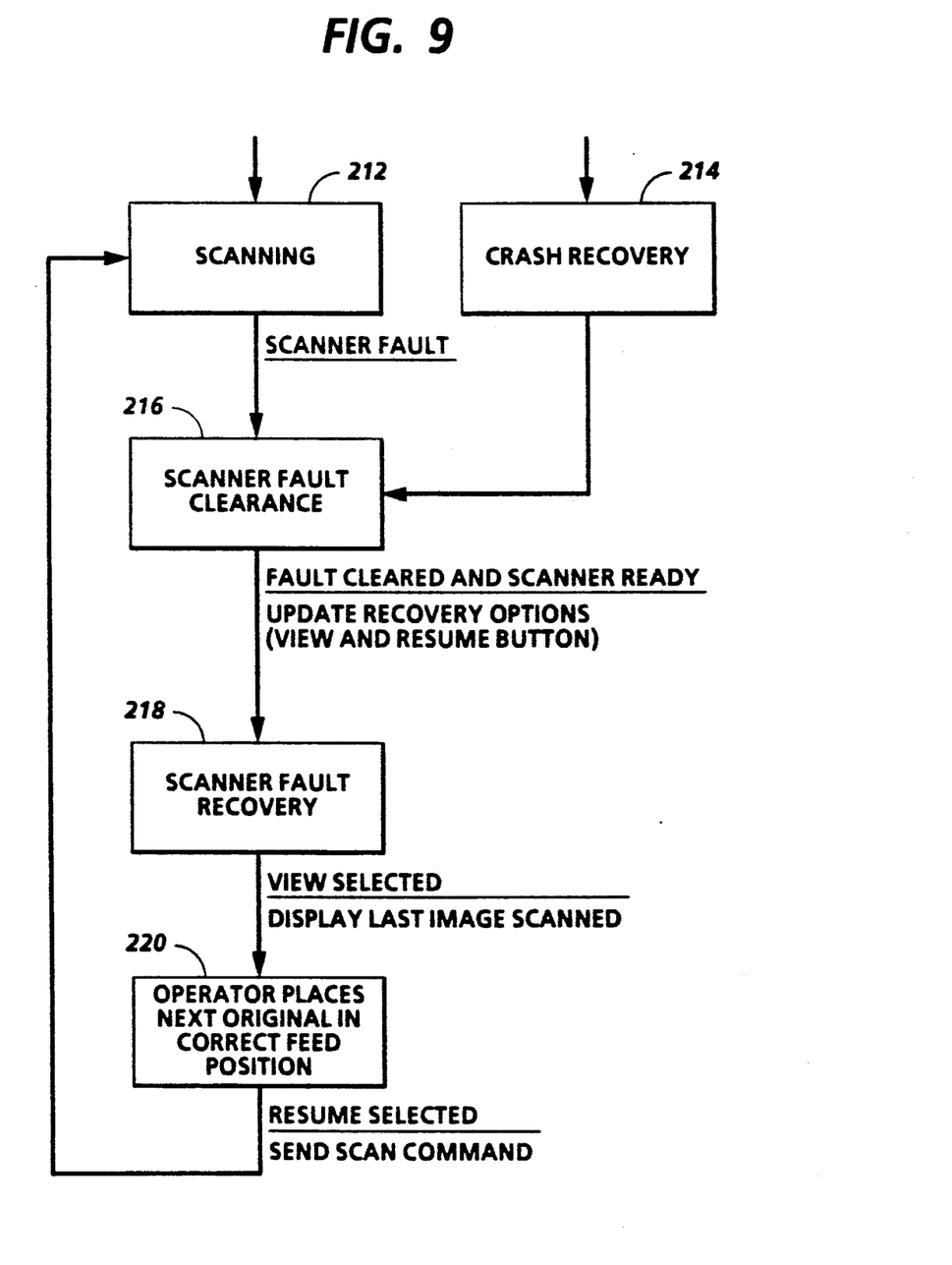
FIG. 9 is a flowchart depicting the image display feature of the FIG. 1 system.

Referring to FIG. 9, there is shown a flowchart depicting an image display operation of the present invention. After the occurrence of a scanner fault during scanning (Step 212) or a crash recovery operation (Step 214), scanner fault clearance instructions are displayed to the operator (Step 216) by dialog or UI 52. Once the fault has been cleared by the operator, recovery options are provided. Recovery from the scanner fault is performed (Step 218). When the operator selects the "View" feature, the last image scanned is displayed at dialog or UI 52. The operator then places the next original in the correct feed position (Step 220). Upon selection by the operator of the "Resume" feature a scan command is sent so that scanning (Step 212) can resume at the proper original.

Scanner crash recovery is primarily controlled by the system control 54. The system control 54 stores scanner state information and scanned image information on a disk 90 in memory 56 as it is received. Upon reboot from a crash, this information can be read from the disk 90 and the state of the scanner system 6 reconstructed. In system 2, the scanner 6 is a separate sub-system, thus it is possible for the system control 54 to crash and the scanner 6 to remain in a running state. To handle these types of crashes, the scanner 6 periodically checks the communications between itself and the system control 54. If the scanner 6 determines that the system control 54 is not responding, it will shut down and wait for instructions from the system control 54. When the system control 54 performs its crash recovery, it indicates to the scanner 6 that a crash has occurred and loads the job state information into the scanner 6. This also causes the scanner 6 to issue faults that are used to clear the paper path.

In order to get the UI 52 back into a valid state after a crash, a recovery is implemented. Every time the system control 54 is booted, the UI 52 asks the system control 54 for the current scan job in progress and its state (current document feed mode). If there is a job in progress, the UI 52 loads the job so that the operator can proceed with programming.

Each scanner input mode has its own unique recovery procedures. The recovery for each scan mode proceeds as follows:

Platen—Display the last image captured to the operator so that the next document required for scanning can be captured. The operator has the capability to clear the fault via a button on UI 52 in the fault frame, if all the documents required have been captured.

SADH and CFF—Display the last image captured to the operator so that the next document required for scanning can be captured via the required source. The operator has the capability to clear the fault via a button on UI 52 in the fault frame, if all the documents required have been captured. The normal misfeed instructions are presented to the operator by UI 52 to enable paper path clearance.

RDH—The operator is given the normal "reorder recovery" (clear all areas) instructions displayed at UI 52 and is instructed to reorder the originals and place them back into the handler. When scanning of the stack is resumed by the operator, the system will automatically slew feed the documents to the image required in the stack and continue scanning from that point. The system determines what the next document to capture is by observing the display of last captured image or by searching the stack contents that were saved on the disk 90. This same stack content information is down-loaded to the scanner 6 so that its document stack knowledge is the same as the system control 54, this information being used by the scanner 6 to detect document miscounts and so that the documents can be inverted correctly when required.

Job recovery proceeds as follows:

The information transfer to system control 54 creates a job by adding steps to the job such that all job changes are written to disk 90 in one update. Each backed up state can be recognized by the database so that the job can be put back into a valid state in the event of a crash during the job construction.

Once scheduler of PWB 70-10 has picked up the job, job updates are written to disk 90 all at once to back up the required state and job information, so that if the system crashes during scan, the system control 54 can recognize its backed up state and perform the required actions (i.e., send faults, reload RDH Stack information, return crash recovery information) to get back into a valid state.

It will be determined if there is a scan job that has to be loaded. System control 54 will provide a procedure which will return whether there is a scan job or not. This procedure would be called by UI 52 as part of initialization. The current job information is obtained so that the system will not have to handle the case where the job is deleted before it has been retrieved.

System 2 further includes a feature wherein partially completed scan jobs resulting from a scanner interruption for any of various reasons, e.g., a scanner fault occurrence, are saved. Saving of scan jobs would ordinarily not be performed until scanning is completed. The operator was thus unable to access the partially completed scan job. According to the present invention, partially completed scan jobs are not only saved but, in addition, the operator can access a partially completed job and is not required to wait until the entire job is completed before being allowed access.

Figure 10:
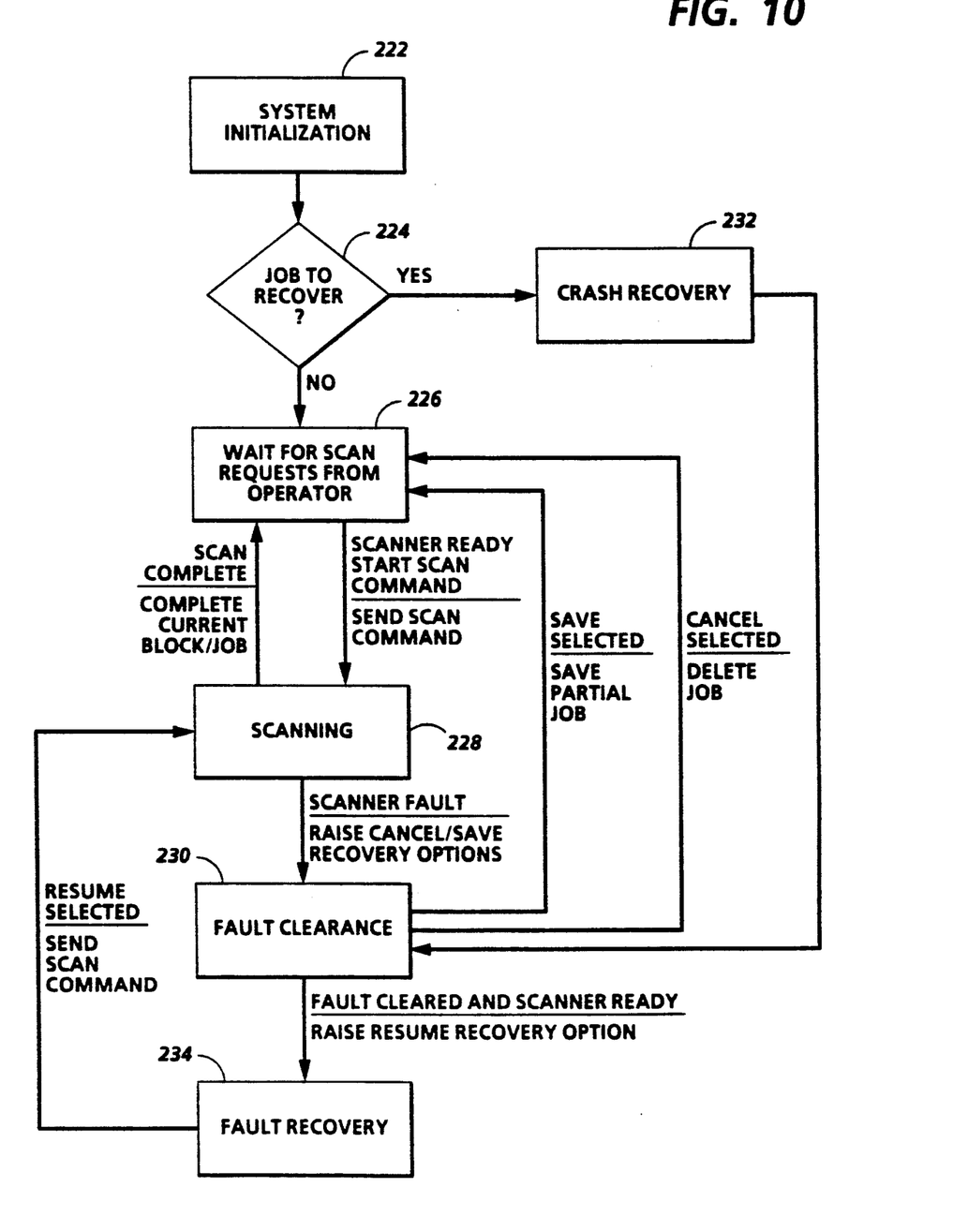
FIG. 10 is a flowchart depicting the save feature of the present invention.

Referring to FIG. 10, there is shown a flowchart depicting the Save feature of the present invention. After system initialization (Step 222), system 2 determines whether there is a job to recover (Step 224). If there is no job to recover, system 2 waits for scan requests from the operator (Step 226). Upon selection by the operator of a start scan command, scanning (Step 228) begins. When scanning is complete, system 2 again waits for scan requests from the operator (Step 226). If a scanner fault occurs during scanning, Cancel/Save recovery options are raised at dialog or UI 52. Fault clearance instructions are provided (Step 230). If the operator selects the save recovery option, the partially completed job is saved in operator accessible memory. The system then waits for scan requests from the operator. If the operator selected the cancel recovery option, the partially completed job is deleted and system 2 waits for scan instructions. Once the scanner fault is cleared and a "Scanner Ready" indication is provided, a "Resume Recovery" option is raised. Recovery from the scanner fault is initiated by the system (Step 234) upon which time scanning is resumed (Step 228). If, at Step 224, it was determined that there is a job to recover, crash recovery (Step 232) in accordance with the above-described FIG. 8 is performed. Upon clearance (Step 230) and recovery (Step 234) from the fault, scanning is resumed upon selection thereof by the operator.

By storing the images in memory after scanning and selectively displaying the last captured image depending on scanner mode, the system 2 thus enables the electronic pre-collation of the job or partial job to be printed. The saving of the images provides for the documents of a current job to be successively captured and added to the job, ordered as close to the document output format as possible and stored in the system file. Once a job has been saved in memory, job "repair" can be easily performed using a "Job Review" feature initiated at user interface 52. Pages of the job can be moved and/or deleted. The job, upon indication at UI 52 that a "disk full" fault (i.e., no more space is left on the disk) has occurred, can be separated into smaller segments. Manipulation of a job is therefore enabled by this system without requiring re-scanning of portions of the job. An additional advantage to storing the images following scanning is that partial jobs can be securely stored. This feature is particularly desirable for use in secure sites when, for example, a service call is required.

The invention as described above provides a system which detects and recovers from system faults affecting scanner operation and further facilitate the resumption of scanning by displaying fault clearance instructions and enabling display to the operator of the last image captured prior to the fault occurrence. The operator can then quickly and easily resume scanning at the appropriate document without wasting time and resources. When scanner operation has been interrupted before job completion, the operator can select a save feature wherein the partially completed scan job is retained in operator accessible memory.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method for operating an electronic reprographic system, comprising the steps of:
   scanning a set of original documents which comprise a job to be printed;
   electronically storing in memory images of the scanned documents;
   converting the images to electronic pages for printing;
   monitoring the system for any interruption in scanning prior to completion of scanning of the job;
   retaining the images of successfully scanned documents in operator accessible memory upon detection of the scanning interruption to enable access to the stored images when scanning of said set has been interrupted prior to completion of the job; and
   displaying a last image stored in memory when the interruption in scanning is detected.

2. The method as recited in claim 1, further comprising the step of:
   permitting resumption of scanning of a document in the set immediately following the last image displayed.

3. The method of claim 1, wherein the last image stored is displayed when the scanner interruption is a result of a scanner fault.

4. The method of claim 1, wherein the last image stored is displayed depending on a scan mode in which the set of original documents is scanned.

5. The method of claim 4, wherein the scan mode is one of a platen mode, Semi-Automatic Document Handling mode or Computer forms feeder mode.

6. The method as recited in claim 1, further comprising a step of permitting resumption of scanning of a document in the set immediately following a last successfully scanned document.

7. The method of claim 1, wherein the scanner interruption is a result of a scanner fault.

8. The method as recited in claim 1, further comprising the step of:
   disabling operation of the system until a paper path of the reprographic system is cleared when the scanner interruption is detected prior to completion of scanning the job.

9. The method of claim 8, further comprising a step of displaying a last image stored in memory.

10. The method of claim 9, wherein the last image is displayed depending on a scan mode in which the set of original documents is scanned.

11. The method of claim 8, further comprising the step of resuming scanning of a document in a set immediately following a last document stored in memory, after clearance of the paper path.

12. The method of claim 8, further comprising a step of resuming scanning of a document on the set corresponding to a last document stored in memory, after clearance of, the paper path.

13. A method for operating an electronic reprographic system comprising the steps of:
   scanning a set of original documents which comprise a job to be printed;
   electronically storing in memory images of the scanned documents;
   monitoring the system for any interruption in scanning prior to completion of scanning of the job; and
   displaying a last image stored in memory when the interruption in scanning is detected.

14. An apparatus for operating an electronic reprographic system comprising:
   scanning means for scanning a set of original documents which comprise a job to be printed;
   controller means for electronically storing in memory images of the scanned documents and converting the images to electronic pages;
   printer means for printing the electronic pages;
   detection means for monitoring the system for detection of any interruption in the operation of the scanner means prior to completion of scanning of the job;
   said controller means retaining the images of successfully scanned documents in operator accessible memory to enable access to the stored images when operation of said scanning means is interrupted prior to completion of scanning the job; and
   means for displaying a last image stored in memory when the interruption in operation of said scanning means is detected.

15. The apparatus of claim 14, further comprising communication means between the scanner means and the controller means for informing the scanner means of a last image stored in memory when the interruption in operation of the scanner means is detected.

16. The apparatus of claim 15, wherein the scanner means operates in one of a plurality of scanner modes, and the communication means informs the scanner means of the one scanner mode when the interruption in operation of the scanner means is detected.

17. The apparatus of claim 15, wherein the scanner means resumes scanning of a document in the set immediately following a document corresponding to the last image stored in memory.

18. The apparatus of claim 16, further comprising means for displaying the last image stored in memory.

19. The apparatus of claim 16, wherein display means displays the last image depending on one the scanner mode.

20. The apparatus of claim 19, wherein the plurality of scanner modes comprises a platen mode, a Semi-Automatic Document Handling mode, a Computer forms feeder mode, and a Recirculation Document Handling mode.

21. The apparatus of claim 19, wherein the display means displays the last image stored when the scanner means is in any one of the platen, Semi-Automatic Document Handling and Computer forms feeder modes.

22. The apparatus of claim 15, wherein the scanner means resumes scanning of a document in a set of documents corresponding to the last image stored in memory.

23. The apparatus as recited in claim 15, further comprising:
means for determining whether the scanner interruption is a result of an occurrence of a scanner fault; and
means for disabling system operation until a paper path of the reprographic system is cleared when said detection means detects occurrence of a fault prior to completion of scanning of the job.

24. An apparatus for operating an electronic reprographic system, comprising:
scanner means for scanning a set of original documents which comprise a job to be printed;
controller means for electronically storing in memory images of the scanned documents and converting the images to electronic pages;
printer means for printing the electronic pages;
detection means for monitoring the system for detection of any interruption in a operation of the scanner means prior to completion of scanning of the job; and
display means for displaying a last image stored in memory when the scanner interruption is detected.

* * * * *